(12) United States Patent
Pok et al.

(10) Patent No.: US 7,305,370 B2
(45) Date of Patent: Dec. 4, 2007

(54) NEURAL CORTEX

(76) Inventors: Yang Ming Pok, 5 W. Coast Walk #03-01, Singapore (SG) 127146; Alexei Mikhailov, Blk 92 Kismis Aveenue #09-02, Singapore (SG) 598268

(*) Notice: Subject to any disclaimer, the term of this patent is extended or adjusted under 35 U.S.C. 154(b) by 385 days.

(21) Appl. No.: 10/398,279

(22) PCT Filed: Nov. 30, 2000

(86) PCT No.: PCT/SG00/00182

§ 371 (c)(1),
(2), (4) Date: Apr. 1, 2003

(87) PCT Pub. No.: WO02/44926

PCT Pub. Date: Jun. 6, 2002

(65) Prior Publication Data

US 2004/0034609 A1    Feb. 19, 2004

(51) Int. Cl.
  G06E 1/00    (2006.01)
  G06E 3/00    (2006.01)
  G06F 15/18   (2006.01)
  G06G 7/00    (2006.01)

(52) U.S. Cl. ........................................................ 706/20
(58) Field of Classification Search .................. 706/20
  See application file for complete search history.

(56) References Cited

U.S. PATENT DOCUMENTS

| | | | |
|---|---|---|---|
| 5,285,522 A | | 2/1994 | Mueller |
| 5,621,848 A | | 4/1997 | Wang |
| 5,893,058 A | * | 4/1999 | Kosaka ........................ 704/254 |
| 5,995,868 A | * | 11/1999 | Dorfmeister et al. ....... 600/544 |
| 6,058,206 A | | 5/2000 | Kortge |
| 6,094,647 A | | 7/2000 | Kato et al. |
| 6,393,413 B1 | * | 5/2002 | Jorgensen et al. ............. 706/20 |
| 6,549,804 B1 | * | 4/2003 | Osorio et al. ................ 600/544 |
| 2002/0095617 A1 | * | 7/2002 | Norman ........................ 714/10 |

FOREIGN PATENT DOCUMENTS

| | | |
|---|---|---|
| EP | 0 684 576 A2 | 11/1995 |
| EP | 0 709 801 A1 | 5/1996 |

OTHER PUBLICATIONS

Associative dynamics in chaotic neural networks Ikeguchi, T.; Aihara, K.; Neural Networks, 1991. 1991 IEEE International Joint Conference on Nov. 18-21, 1991 pp. 2282-2287 vol. 3 Digital Object Identifier 10.1109/IJCNN.1991.170728.*

(Continued)

*Primary Examiner*—Anthony Knight
*Assistant Examiner*—Michael B. Holmes
(74) *Attorney, Agent, or Firm*—TraskBritt

(57) ABSTRACT

A neural network system includes a random access memory (RAM); and an index-based weightless neural network with a columnar topography; wherein patterns of binary connections and values of output nodes' activities are stored in the RAM. Information is processed by pattern recognition using the neural network by storing a plurality of output patterns to be recognized in a pattern index; accepting an input pattern and dividing the input pattern into a plurality of components; and processing each component according to the pattern index to identify a recognized output pattern corresponding to the input pattern.

7 Claims, 1 Drawing Sheet

OTHER PUBLICATIONS

Design and analysis of a nonequilibrium cross-coupled network with a detectable similarity measure Shimono, M.; Yamakawa, T.; Neural Networks, IEEE Transactions on vol. 11, Issue 1, Jan. 2000 pp. 57-68 Digital Object Identifier 10.1109/72.822510.*

Optical inner-product implementations for multi-layer BAM with 2-dimensional patterns Hyuek-Jae Lee; Soo-Young Lee; Cheol Hoon Park; Sang Yung Shin; Neural Networks, 1991. 1991 IEEE International Joint Conference on Nov. 18-21, 1991 pp. 1729-1734 vol. 2 Digital Object Identifier 10.1109/IJCNN.1991.170675.*

On reducing the influence of noise in a new model for optimal linear associative memory Tuan, C.-H.; Li, B.; Yau, S.-T.; Mullin, L.; Neural Networks, 1991. 1991 IEEE International Joint Conference on Nov. 18-21, 1991 pp. 2764-2769 vol. 3 Digital Object Identifier 10.1109/IJCNN.1991.170333.*

Ho et al., "A Computational Model for Recognition of Multifont Word Images," Machine Vision and Applications (1992), pp. 5:157-168.

Kan et al., "A Probabilistic Logic Neuron Network for Associative Learning," IEEE First International Conference of Neural Networks (Jun. 21-24, 1987), The Institute of Electrical and Electronics Engineers, Inc., San Diego, California, pp. II-541-II-548.

Aleksander et al., "Computer Vision Systems for Industry: Comparisons", Digital Systems for Industrial Automation, 1982, pp. 179, 183-193.

Bledsoe et al., "Pattern Recognition and Reading by Machine", Proceedings of the Eastern Joint Computer Conference, 1959 pp. 225-232.

Cook, Normal D., "The Brain Code", 1986, p. 96, Methuen & Co., Ltd.

Kanerva, P., "Sparse Distributed Memory", date unknown, pp. 56, 72, 73, Cambridge, MA: NIT Press.

Morciniec et al., "The n-Tuple Classifier: Too Good to Ignore", 1995, pp. 1-11.

Schalkoff, Robert J., "Artificial Neural Networks", 1997, pp. 2,10,390,391,399, The McGraw-Hill Companies, Inc.

International Search Report dated Apr. 20, 2001, 3 pages.

* cited by examiner

NEURAL CORTEX

BACKGROUND OF THE INVENTION

Field of the Invention

The invention relates to a pattern recognition device that has an index-based weightless neural network with a columnar topography, and to a method whereby an input pattern is divided into a plurality of components and each component is processed to identify a recognized output pattern corresponding to the input pattern.

An artificial neural network is a structure composed of a number of interconnected units typically referred to as artificial neurons. Each unit has an input/output characteristic and implements a local computation or function. The output of any unit can be determined by its input/output characteristic and its interconnection with other units. Typically the unit input/output characteristics are relatively simple.

There are three major problems associated with artificial neural networks, namely: (a) scaling and hardware size practical limits; (b) network topology; and (c) training. The scaling and hardware size problem arises because there is a relationship between application complexity and artificial neural network size, such that scaling to accommodate a high resolution image may require hardware resources which exceed practical limits.

The network topology problem arises due to the fact that, although the overall function or functionality achieved is determined by the network topology, there are no clear rules or design guidelines for arbitrary application.

The training problem arises because training is difficult to accomplish.

The n-Tuple Classifier has been proposed in an attempt to address these problems. This classifier was the first suggested RAM-based neural network concept. The first hardware implementation of the n-Tuple Concept was the WISARD system developed at Brunel University around 1979 (see "Computer Vision Systems for Industry: Comparisons," appearing as Chapter 10 in "Computer Vision Systems for Industry," I. Alexander, T. Stonham and B. Wilkie, 1982). The WISARD system belongs to the class of RAM-based weightless neural networks. This style of neural network addresses the problem of massive computations-based training by writing the data into a RAM-network and the problem of topology by suggesting a universal RAM-based network structure. However, the network topology of WISARD-type universal structure leads to inefficient use of memory with the consequence that the problem of scaling still remains acute within RAM-based neural networks, and the application range of the WISARD-technology is limited.

Another example of neural networks that overcomes the problem of training by a simple memorization task is Sparse Distributed Memory (P. Kanerva, 1998, "Sparse Distributed Memory," Cambridge, Mass.: MIT Press). However, a problem with the Sparse Distributed Memory, as with the WISARD system, is a large memory size. Another disadvantage of the Sparse Distributed Memory is its computational complexity. This is because for this type of memory, an input word must be compared to all memory locations.

N-Tuple classification systems use a method of recognition whereby an input to the neural network is divided into a number of components (n-Tuples) with each component addressing a respective one of a series of component look-up tables. Each memory cell of the RAM stores a discriminator word that has as many bits in it as there are pattern classes. Whenever a pattern is present at the input, each component addresses just one of its discriminator words. The network totals the number of 1s addressed in each bit position and recognizes the pattern as the class that gives the biggest score (see "Computer Vision Systems for Industry: Comparisons," appearing as Chapter 10 in "Computer Vision Systems for Industry," I. Alexander, T. Stonham and B. Wilkie, 1982, page 189).

The presence of a number of look-up tables results in a potentially large memory size. The memory size required is proportional to the number of components which the network may identify. This can result in a substantial increase in memory where the pattern size increases. For example, an artificial neural network might be designed for an image processing application, initially using an n×n image, where n=128. This is a relatively low-resolution image by today's standards. Where the image to be processed increases from n=128 to n=2048, the size of the network increases by a factor of 256. This increase in memory results in the requirement for network expansion potentially requiring additional hardware modular blocks. Where the resolution of the image increases a point is quickly reached where the scaling to accommodate a high resolution image is beyond a practically achievable memory limit.

An object of the present invention is to address, overcome or alleviate some or all of the disadvantages present in the prior art.

BRIEF SUMMARY OF THE INVENTION

According to a first aspect of the invention, there is provided a RAM-based weightless neural network device for classifying an input pattern as corresponding to one of a plurality of output patterns, comprising an input arranged to decompose an input pattern into a plurality of components, and RAM storing, for each component, a plurality of output pattern indications defining a column corresponding to the component, and having address lines so as to form a look-up table, the address lines being addressed by each of the components, characterized in that the RAM comprises a RAM for storing a plurality of address entities defining a linked data representation to represent the component, and in that a logic device is provided for causing sequential accessing of the plurality of address entries.

The n-Tuple Classifier of the prior art requires the height of columns (i.e., the number of output pattern class indicators they store) to be flat and predetermined. For instance, if just a few columns are tall (i.e., containing many output pattern indications) whereas most columns are short, then the allocated memory is mostly wasted. In contrast, the variable columnar height of embodiments of the invention, achieved by the use of the linked data structure, takes up less total memory.

Preferably, the neural network hardware component is a computer hardware component.

In a preferred form the neural network hardware component has potential for scaling. Scaling may be achieved in any suitable manner. It is preferred that systematic expansion is achieved by increasing the size of the RAM.

The neural network may be trained in any suitable manner. It is preferred that the neural network is trained by writing of data into the RAM and network topology emerges during the training.

It is preferred that performance of the neural network is adjustable by changing decomposition style of input data, and thereby changing dynamic range of input components.

It is preferred that input components to the neural network address a single common index.

According to a second aspect of the invention, there is provided a method of processing an input pattern by pattern recognition using a neural network storing an index to identify a recognized output pattern corresponding to the input pattern, the method including the steps of—
 (a) storing a plurality of output pattern indications, each corresponding to an output pattern to be recognized;
 (b) accepting an input pattern;
 (c) dividing the input pattern into a plurality of components; and
 (d) processing each component according to the index, the processing comprising, for each component:
  (1) looking up, in RAM, a first link associated with a first output pattern;
  (2) using the first link to look up, in RAM, a second link associated with a second output pattern; and
  (3) for each link looked up, increasing a corresponding stored score corresponding to the associated output pattern.

Preferably each output pattern is divided into a plurality of recognized components with each recognized component being stored in the pattern index for recognition. The index preferably consists of columns with each column corresponding to one or more recognized components. Preferably the index is divided into a number of columns which is equal to or less than the number of recognized components. More preferably, the index is divided into a number of columns which is equal to the number of recognized components.

The method may further include the steps of each input component being compared to the corresponding recognized component column, and a score being allocated to one or more recognized components. Preferably the score for each recognized component of a pattern is added and the recognized pattern with the highest score is identified as the output pattern.

BRIEF DESCRIPTION OF THE SEVERAL VIEWS OF THE DRAWINGS

The invention will now be described in further detail by reference to the attached drawings which show an example form of the invention. It is to be understood that the specificity of the following description does not limit the generality of the foregoing disclosure.

DETAILED DESCRIPTION OF THE INVENTION

Figure 1:
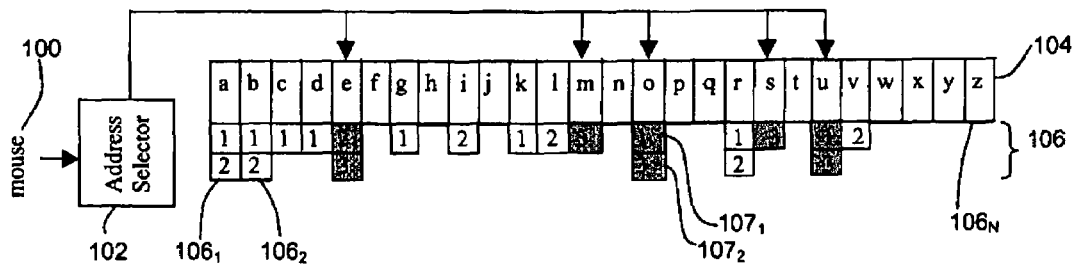
FIG. 1 is an index table illustrating recognition processing according to one embodiment of the invention.

The invention can be implemented through the use of a neural card built with the use of standard digital chips. The invention is an index-based weightless neural network with a columnar topology that stores in RAM the indications of output patterns. The network offers:
 (a) Scaling potential: Systematic expansion of the neural network can be achieved not by adding extra modular building blocks as in previous artificial neural networks, but by increasing the RAM size to include additional columns or by increasing the height of the index. For example, 16 million connections can be implemented with a 64 MB RAM.
 (b) The required memory size is reduced by a factor of N, when compared with previous n-Tuple systems such as the WISARD system, with N being the number of input components (n-Tuples).
 (c) The network topology emerges automatically during the training.
 (d) Training is reduced to writing of data into RAM.
 (e) The performance can easily be adjusted by changing the dynamic range of input components, which can be achieved by changing the decomposition style of input data.

A device made according to the present embodiment is herein referred to as a Neural Cortex by the inventors. A general view of the single common index on which the present invention is based can best be described as a collection of vertical columns, wherein the signals propagate in a bottom-to-top fashion.

Unlike traditional RAM-based neural networks, the present embodiment operates by creating and memorizing an index (a linked data representation) of input components. This index is created on training.

On retrieval, the present embodiment, like the prior art n-Tuple Classifier, sums up the number of times each output class pattern was activated by input components. The summing operation provides the generalizing ability typical of neural networks. However, unlike the prior art n-Tuple Classifier, the present embodiment uses a single common storage. In the case of the prior art n-Tuple Classifier, each input component (n-tuple) addresses its own look-up table. In the case of the described embodiment, all input components address a single common index. This brings about a dramatic decrease in memory size. The absence of a single common index in both the n-Tuple Classifier and the Sparse Distributed Memory systems explains why previous RAM-based neural networks had difficulties in terms of memory requirements whose large size significantly limited the application range.

Further, a single common index according to a preferred and described embodiment is an efficient solution to the neural network expansion problem. As has been indicated above, both traditional artificial neural networks and traditional RAM-based artificial neural networks have scaling difficulties when the application size grows. For instance, if the image size grows from 128×128 pixels to 2048×2048, then a traditional artificial neural networks will need a 256-fold increase in memory because the number of n-tuples increases by the factor of 256=2048*2048/128*128. However, paradoxically, in the same situation, the memory size according to the present embodiment may remain unchanged because still only one common index is used.

The present embodiment creates a single pattern index (104) of input components. The index contains the output components and is created by storing the output pattern and training the neurons to recognize the pattern stored within the pattern index.

An output pattern S is decomposed into N number of components $S_1, S_2, S_N$ (each having a reference number), such that each component $S_i$ is interpreted as the address of a column ($106_1, 106_2, \ldots 106_1, \ldots 106_N$) from the index (104). Each column stores entries ($107_1, 107_2$) containing the reference number of those patterns which have the value $S_i$ in one or more of their components; each column does not contain more than one sample of each reference number. When an input I (100) is received, this is divided into a number of components $I_1, I_2, \ldots, I_X$. Each input component $I_1$, to $I_X$ is processed by the network by inputting the component with the pattern index (104) via an address selector (102). Where a component of the input $I_i$ produces a component of the output $S_i$, then each reference number listed ($107_1, 107_2$) in the column ($106_i$) of $S_i$ has a score of one added to its total. This process is repeated for each of the input components. The scores are then added to determine the winner. The winner is the reference number with the greatest score. The reference number, corresponding to a recognized output pattern, is recognized by the network.

An example of the device containing the pattern index is illustrated in FIG. 1. This figure illustrates where the device has been trained or programmed to recognize three words "background," "variable" and "mouse." In this figure the words are assigned the reference numbers 1, 2 and 3 respectively. The output patterns are letters from "a" to "z" with these included as columns (106) within the index (104). When an input (100) is received by the network, each of the components of the input is processed by reference to this single pattern index. In this example the input is in the form of the word "mouse." This input (100) is subsequently broken down into five letters (the input components). Each letter is processed in the network by using the index (104). The nature of processing undertaken in the network can ensure that processing of each component is undertaken virtually simultaneously. The following processing is undertaken—

(a) the component of the input "m" is processed and in this case one point is added to the score attributable to reference number 3 (corresponding to output pattern "mouse");

(b) the component input "o" is processed and one point is added to the scores attributable to reference numbers 1 and 3 (corresponding to output patterns "background" and "mouse");

(c) the component input "u" is processed and one point is added to the scores attributable to reference numbers 1 and 3 (corresponding to output patterns "background" and "mouse");

(d) the component input "s" is processed and one point is added to the scores attributable to reference number 3 (corresponding to output pattern "mouse");

(e) the component input "e" is processed and one point is added to the scores attributable to reference numbers 2 and 3 (corresponding to output patterns "variable" and "mouse").

The network then sums up (not shown in this figure) the points attributable to each variable. In this instance variable 1 has a score of 2, variable 2 a score of 1 and variable 3 has a score of 5. The variable with the highest score is determined to be the winner and hence identified. The variable 3 which has a score of 5, corresponding to the word "mouse," is, therefore, considered to be identified.

In the case of standard RAM according to the prior art, two different address words (i.e., input pattern components) always point towards two different memory locations. This is no longer true in the case of the described embodiment which uses a single index. For example, if the input pattern has three components (a, b, c) and the component dynamic range is 1 byte then the patterns (a, c, b), (b, a, c), (b, c, a), (c, a, b), (c, b, a) will produce the same score equal to 3 because the device according to the present embodiment is invariant with respect to permutations. The invariance is caused by the fact that all input components (n-tuples) address a single common index, thus creating the permutational invariance, which is the price to be paid for dramatic reduction in memory size as compared to traditional RAM-based neural networks. This invariance becomes practically harmless when the component dynamic range is increased. For the above example, by increasing the component dynamic range from 1 byte to 2 bytes, where the pattern (a, b, c) is converted into the 2 component pattern (ab, bc), the following scores will be obtained: (a, b, c)=>2, (a, c, b)=>0, (b, a, c)=>0, (b, c, a)=>1, (c, a, b)=>1, (c, b, a)=>0, so that the pattern (a, b, c) will be identified correctly.

In general case, the conversion of the n-component input pattern $(s_1, s_2, \ldots, s_N)$ into a new pattern $(c_1, c_2, \ldots, c_M)$ whose components have a greater dynamic range and M<N is preferably done by the software driver of the card of the present embodiment.

Figure 2:
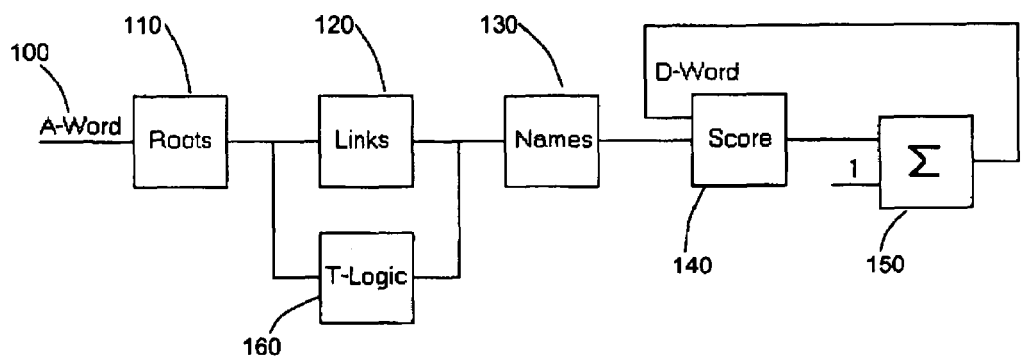
FIG. 2 is a schematic block diagram illustrating a read cycle process according to that embodiment of the invention.

A read-cycle block-diagram of the embodiment is shown in FIG. 2. The blocks "Roots" (110), "Links" (120), "Names" (130), "Score" (140) are RAM-devices. $\Sigma(150)$ is a summer. T-logic (160) is a terminating logical device.

1. Each pattern component (A-Word) is passed to the address bus of the "Roots" RAM (110).
2. The output value R of the "Roots" RAM (110) is passed to the address bus of the "Links" RAM (120).
3. The output value L of the "Links" RAM (120) is passed to the address bus of the "Names" RAM (130).
4. And, finally, the output value N of the "Names" RAM (130) is passed to the address bus of the "Score" RAM (140).

If L is 0 then the T-logic (160) terminates the process. Otherwise, the "Score" RAM (140) content found at address N that is determined by the output of the "Name" RAM is incremented by the value of 1. Next, the "Links" RAM (120) output is fed back to the "Links" RAM (120) address bus. The process repeats itself from point 3.

Figure 3:
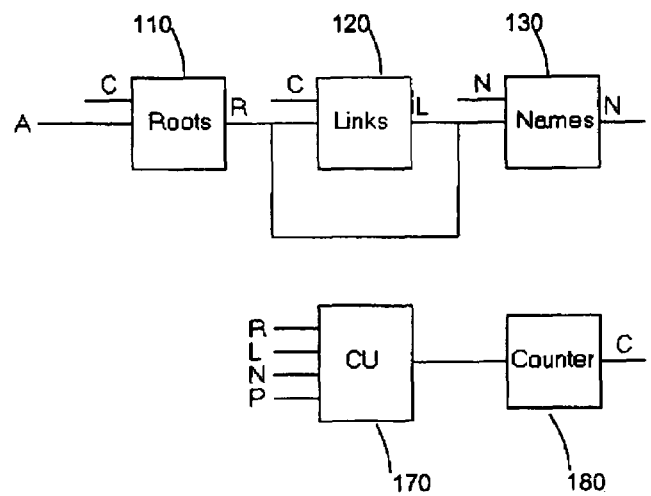
FIG. 3 is a schematic block diagram illustrating processing of a write cycle process output according to that embodiment of the invention.

A corresponding write-cycle block-diagram is shown in FIG. 3. CU is the control unit (170).

1. Each pattern component A is passed to the address bus of the "Roots" RAM (110).
2. The output value R of the "Roots" RAM (110) is passed to the address-bus of the "Links" RAM (120).
3. The output value L of the "Links" RAM (120) is passed to the address-bus of the "Names" RAM (130). The output value of the "Names" RAM (130) is denoted by N, and the current pattern name by P.
4. The values R, L, N and P are passed to the control unit 170, which utilizes the following logic. If L is 0 then the control unit makes a decision (point 5) on updating "Roots," "Links," and "Names" RAM (130). Otherwise, L is fed back to the "Links" RAM (120) address bus. The process repeats itself from point 3.
5. Decision Logic:
   a) if N=P, terminate the process;
     if R=0, increment the counter value C by 1,
       write C to "Roots" RAM (110) at address A,
       write C to "Links" RAM (120) at address R,
       write P to "Names" RAM (130) at address L,
     if R>0 & L=0, increment the counter (180) value C by 1,
       write C to "Links" RAM (120) at address R,
       write P to "Names" RAM (130) at address L,
   b) terminate the process.

Performance of the embodiment can be adjusted in terms of memory size and read/write times. Normally, storage and recall times increase when the number of classes grows as the training continues. Additional classes increase the amount of reference numbers that are stored in index columns and, therefore, the amount of index cells that have to be accessed. As a remedy, one can increase the dynamic range D of input pattern components. This increases the number of index columns because the index address space is equal to D. As a result, the same amount of reference numbers will be spread upon the greater area, which, in turn, decreases the average index height H.

The processing time on storage and recall is proportional to the number of accessed memory cells, which is proportional to HN. Here, N is the number of the pattern components. As D increases, the processing time approaches O(N). This follows from the fact that H is inversely proportional to D.

The memory size is proportional to HD. However, H grows/decreases faster than D. Hence, adjusting the dynamic range D can efficiently control the memory size. In the worst case, the memory size does not exceed CD, where C is the number of pattern classes, which is because the embodiment has only one "look-up-table." On the other hand, the memory size of a traditional RAM-based artificial neural network is CDN because for this type of artificial neural network the number of input look-up-tables is equal to the number N of input pattern components.

It is to be understood that various modifications, alterations and/or additions may be made to the parts previously described without departing from the ambit of the present invention.

The invention claimed is:

1. A method of processing an input pattern by pattern recognition using a neural network storing an index to identify at least one output pattern as a recognized output pattern corresponding to the input pattern, the method including the acts of: storing a plurality of output pattern indications, each corresponding to an output pattern to be recognized;

accepting an input pattern;

dividing the input pattern into a plurality of input components;

processing each input component of the plurality according to the index, the processing comprising:

looking up, in a RAM, a first link associated with a first output pattern;

using the first link to look up, in the RAM, a second link associated with a second output pattern; and for each of the first link and the second link looked up, increasing a corresponding stored score corresponding to the associated first output pattern and the associated second output pattern, respectively; and using each input component of the plurality of input components as the address of a corresponding output pattern column wherein the stored score is allocated to one or more recognized output patterns that are found in the corresponding output pattern columns;

outputting as the recognized output pattern the output pattern with a highest score.

2. The method according to claim 1, wherein each of the at least one output pattern is divided into a plurality of recognized components with each recognized component being stored in the index for recognition.

3. The method according to claim 2, wherein the index consists of columns with each column corresponding to one or more recognized components, each column being represented with a plurality of linked index values.

4. The method according to claim 3, wherein the index is divided into a number of columns which is equal to or less than the number of recognized components.

5. The method according to claim 3, wherein the index is divided into a number of columns which is equal to the number of recognized components.

6. The method according to any one of claims 2 to 4, wherein each input component of the plurality of input components is used as the address of a corresponding output pattern column and a score is allocated to one or more recognized output patterns that are found in the corresponding output pattern columns.

7. The method according to claim 6, wherein the output pattern with the highest score is identified as the recognized output pattern.

* * * * *

UNITED STATES PATENT AND TRADEMARK OFFICE
CERTIFICATE OF CORRECTION

PATENT NO. : 7,305,370 B2  Page 1 of 1
APPLICATION NO. : 10/398279
DATED : December 4, 2007
INVENTOR(S) : Yang Ming Pok and Alexei Mikhailov It is certified that error appears in the above-identified patent and that said Letters Patent is hereby corrected as shown below:

On the title page:
In ITEM (76) Inventors, third line: change "Blk 92 Kismis Aveenue" to --Blk 92 Kismis Avenue--

In ITEM 56 References Cited:
OTHER PUBLICATIONS,
page 2, $2^{nd}$ column, $4^{th}$ entry    change "Kanerva, P., "Sparse Distributed Memory", date unknown, pp. 56, 72, 73, Cambridge, MA: NIT Press." to --Kanerva, P., "Sparse Distributed Memory," date unknown, pp. 56, 72, 73, Cambridge, MA.: MIT Press.--

COLUMN 2, LINE 18,    change "n=2048 , the" to --n=2048, the--

Signed and Sealed this

Tenth Day of June, 2008

JON W. DUDAS
*Director of the United States Patent and Trademark Office*